United States Patent
Horng et al.

(10) Patent No.: US 7,884,512 B2
(45) Date of Patent: Feb. 8, 2011

(54) FIXING STRUCTURE FOR PRINTED CIRCUIT BOARD OF MICRO MOTOR

(75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 531 days.

(21) Appl. No.: 11/797,391

(22) Filed: May 3, 2007

(65) Prior Publication Data
US 2008/0223905 A1    Sep. 18, 2008

(30) Foreign Application Priority Data
Mar. 15, 2007   (TW)  .............................. 96108993 A

(51) Int. Cl.
H02K 7/00 (2006.01)
H02K 1/14 (2006.01)
H02K 11/00 (2006.01)
H02K 5/00 (2006.01)
H02K 13/04 (2006.01)

(52) U.S. Cl. ................. 310/67 R; 310/40 R; 310/68 R; 310/71; 310/89; 310/237

(58) Field of Classification Search ............... 370/67 R, 370/68 B, 184, 237, 60 R, 81, 71, 254, 261, 370/68 R
See application file for complete search history.

(56) References Cited

U.S. PATENT DOCUMENTS

| 5,245,236 A | * | 9/1993 | Horng | 310/67 R |
| 5,666,011 A | * | 9/1997 | Hong | 310/40.5 |
| 5,757,180 A | * | 5/1998 | Chou et al. | 324/207.2 |
| 5,942,821 A | * | 8/1999 | Shin | 310/67 R |
| 6,757,171 B2 | * | 6/2004 | Bauer et al. | 361/719 |
| 2006/0232149 A1 | * | 10/2006 | Horng et al. | 310/68 B |

* cited by examiner

*Primary Examiner*—Quyen Leung
*Assistant Examiner*—Jose A Gonzalez Quinones
(74) *Attorney, Agent, or Firm*—Alan Kamrath; Kamrath & Associates PA

(57) ABSTRACT

The present invention relates to a fixing structure for printed circuit board (PCB) of micro motor, including a base and a PCB. The base has a shaft tube disposed centrally therein; at least a circuit board fixing pin is protruded beyond the base peripheral to the shaft tube; the PCB has a center hole for the shaft tube to be inserted in, and the diameter of the center hole shall be close to but not less than the outer diameter of the shaft tube; each circuit board fixing pin corresponds to a through hole disposed on the center of the PCB. Sensing plates are prevented from dropping to secure the motor to stably rotate; the circuit board fixing pin, after passing through the through hole, is fixed by an adhesive or a soldering means to make the PCB and the base perfectly fit and free from warp and vibration.

5 Claims, 5 Drawing Sheets

A SECTIONAL VIEW ON A-A

A SECTIONAL VIEW ON B-B

FIXING STRUCTURE FOR PRINTED CIRCUIT BOARD OF MICRO MOTOR

FIELD OF THE INVENTION

The present invention relates to a fixing structure for printed circuit board (PCB) of micro motor, and more particularly to a practical structure that can simply, promptly and conveniently fix a PCB on a correct sensing position to prevent the occurrence of starting difficulty.

BACKGROUND OF THE INVENTION

As shown in FIG. 1, a conventional motor structure includes a rotor 10 having a spindle 11 fixedly and centrally disposed therein, a base 20 having a shaft tube 21 centrally disposed therein, a bearing 22 disposed in the shaft tube 21, such that the spindle 11 of the rotor 10 can penetrate through the bore of the bearing 22 and is supported by the bearing 22 to rotate therein, and a stator set 30 fixedly sleeved around the periphery of the shaft tube 21 and having a circuit board 32 disposed between the bottom part of the stator set 30 and the base 20 by means of a plurality of foot pins 31.

The circuit board 32 of the aforementioned conventional motor structure is fixed by the plural protruded foot pins 31 that are fixed on the bottom part of the stator set 30, and the stator set 30 is fixedly sleeved around the periphery of the shaft tube 21 so as to attain the positioning purpose. As a result, an inner hole 33 of the circuit board 32 is not intended to be in contact with the shaft tube 21.

Whereas, when motor structure consistently heads for the slim and miniaturized design, the stator set must be simplified to a coil fixed on a circuit board while the circuit board loses the target for positioning and fixing itself.

As a consequence, to completely tackle the issue intrinsic to the above-mentioned conventional structure, a fixing structure of circuit board with a brand new idea must be aggressively conceived and developed such that the circuit board of the micro board can be promptly, conveniently and correctly positioned to prevent the occurrence of starting difficulty.

SUMMARY OF THE INVENTION

In view of the foregoing concern, the present invention thus provides a fixing structure for PCB of micro motor, which includes a base having a shaft tube centrally disposed therein, a bearing disposed in the shaft tube to support rotation of a rotor therein, a PCB having a center hole to be inserted by the shaft tube, in which the diameter of the center hole shall be close to but not less than the outer diameter of the shaft tube, and a sensing plate disposed underneath the PCB.

Therefore, when the shaft tube is inserted in the center hole of the PCB, the correct sensing position of the PCB is simultaneously positioned so as to prevent the occurrence of starting difficulty.

Besides, there is at least one positioning pin of the PCB extended beyond the periphery of the shaft tube, and a through hole on the PCB is disposed to correspond to a respective positioning pin.

Hence, after the positioning pins of the PCB penetrate through the through holes, an adhesive or a soldering means can be employed to fix the fixing pins, such that the PCB and the base are perfectly fit to prevent from being warped or vibrated.

DETAILED DESCRIPTION OF THE PREFERRED EMBODIMENT

Figure 1:
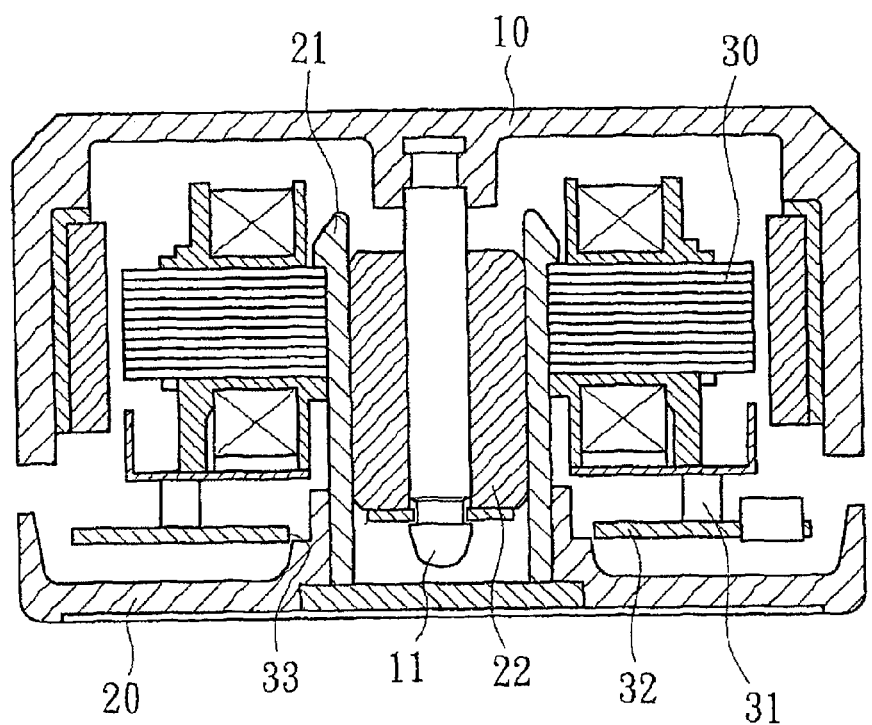
FIG. 1 is a cross-sectional view of a conventional structure.
Figure 2:
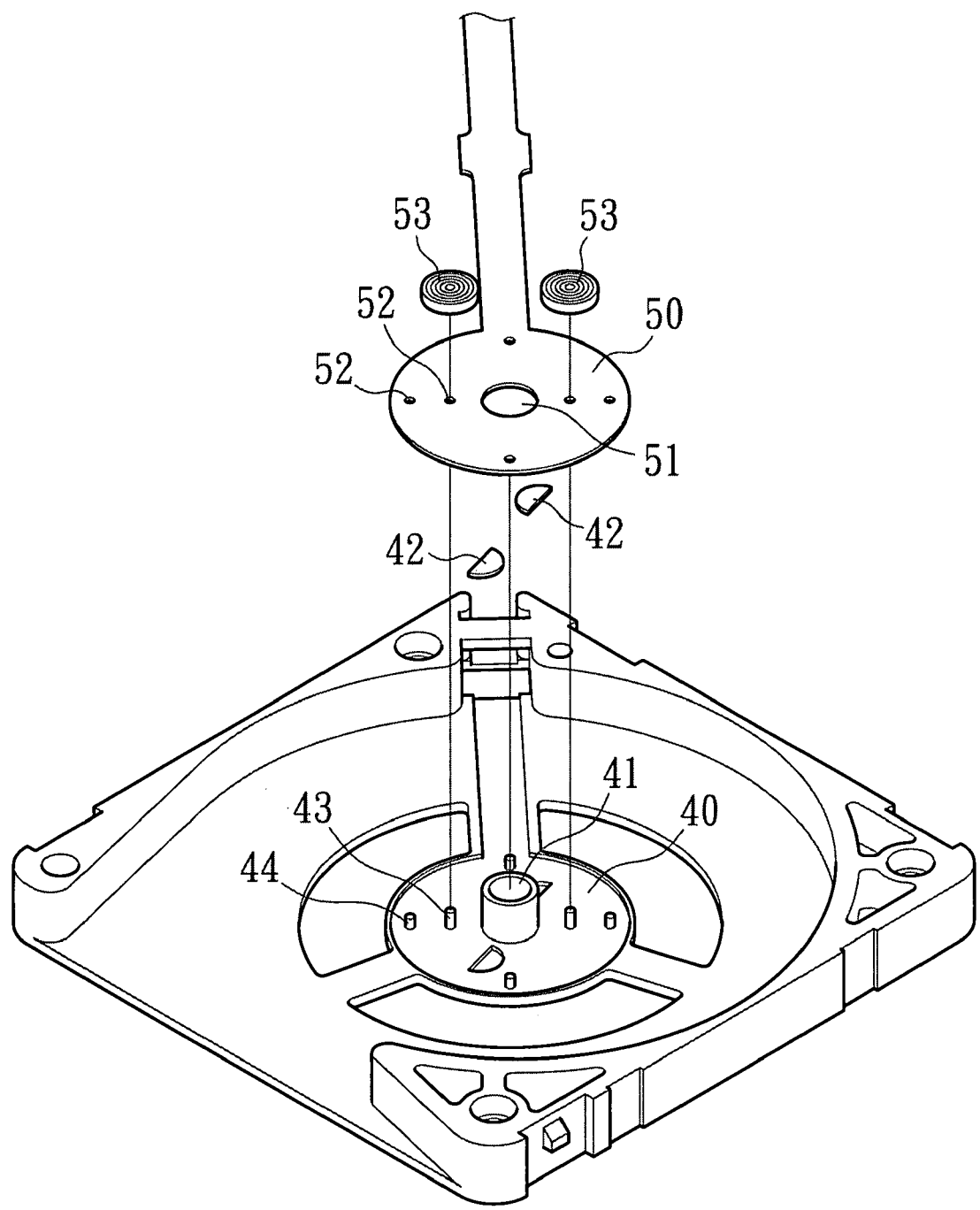
FIG. 2 is an exploded view showing the first preferred embodiment of the present invention.

The present invention relates to a fixing structure for PCB of a micro motor. As shown in FIG. 2, the first preferred embodiment of the present invention relates to a micro blower fan motor. The micro blower fan motor includes a base 40 having a shaft tube 41 disposed centrally therein, a bearing (not shown) disposed in the shaft tube 41 to support rotation of an impeller rotor;

a base located on the periphery of the shaft tube 41 and embedded with a sensing plate 42, in which the sensing plate 42 is composed of a material with magnetic effect, e.g. iron metal, and its form can be annular, at least two sensing plates are so located in a radial manner that each radially-connected line thereof passes through a center of the shaft tube 41 (as shown in FIG. 2), the sensing plate 42 generates a limiting force to downwardly attract the magnet of the impeller rotor so as to make rotation of the impeller rotor more stable and simultaneously prevent the spindle of the impeller rotor from coming off the shaft tube 41;

at least two coil fixing pins 43 and at least one circuit board positioning pin 44 protruded beyond the base 40 peripheral to the shaft tube 41, in which the coil fixing pins 43 shall be so located that each radially-connected line thereof passes through a center of the shaft tube 41; and a PCB 50 having a center hole 51, in which the diameter of the center hole shall be close to but not less than the outer diameter of the shaft tube 41, and through holes 52 are disposed on the PCB to correspond to the positions of the coil fixing pins 43 and the circuit board positioning pins 44 of the base 40.

Figure 3:
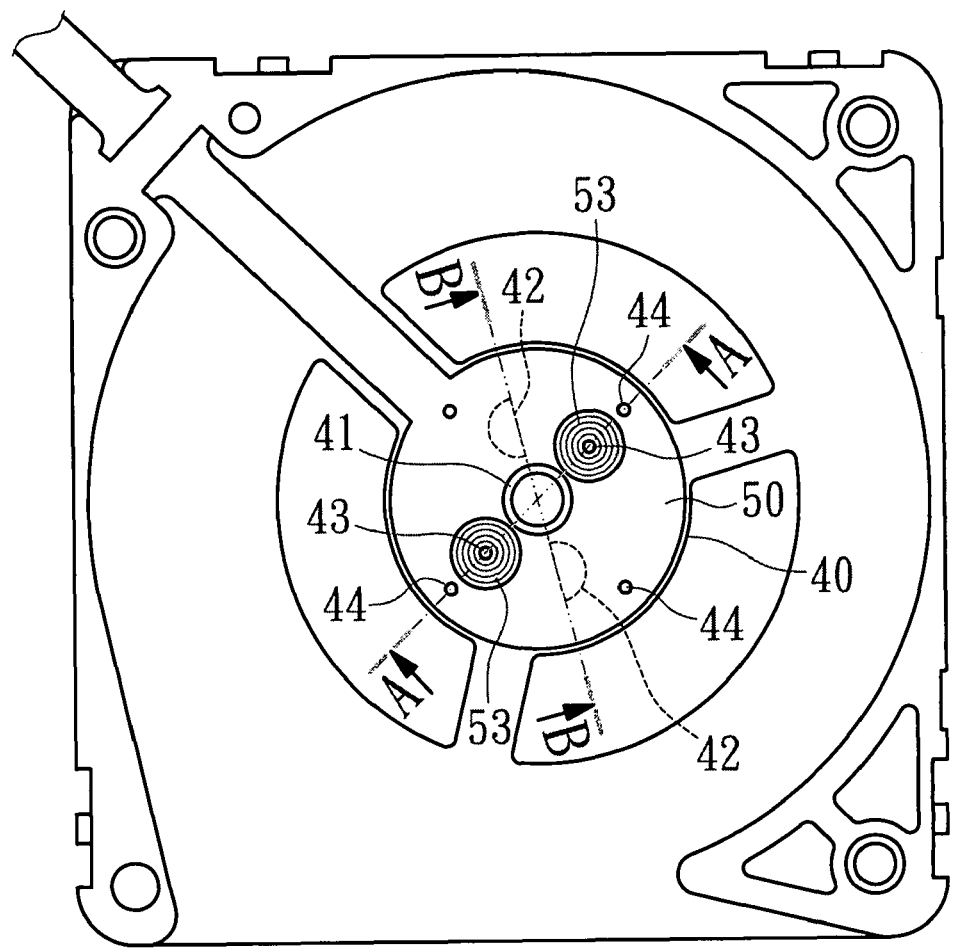
FIG. 3 is a plan view showing the first preferred embodiment of the present invention.
Figure 4:
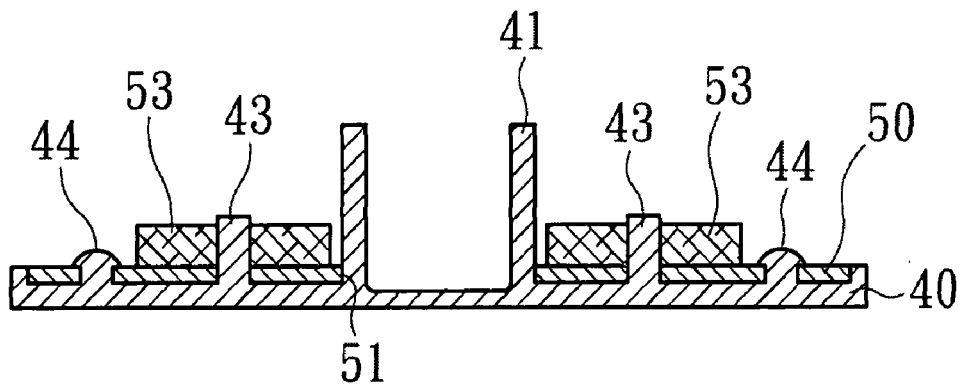
FIG. 4 is a cross-sectional view (I) partially showing the first preferred embodiment of the present invention.
Figure 5:
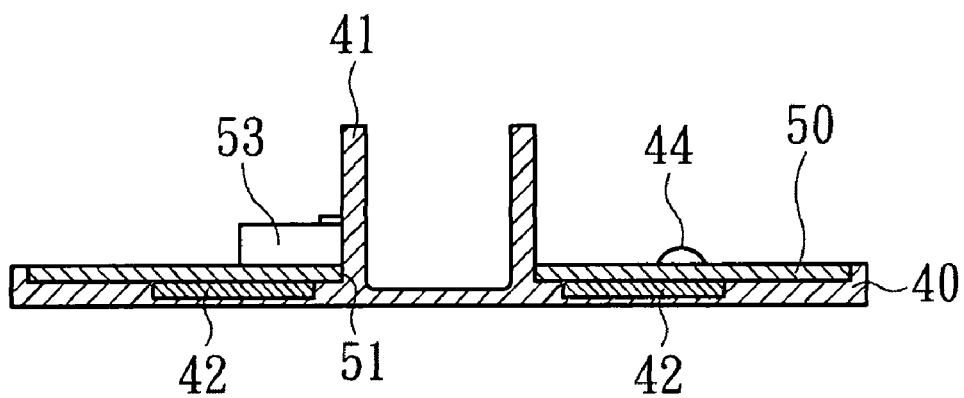
FIG. 5 is a cross-sectional view (II) partially showing the first preferred embodiment of the present invention.

Together with the illustration of FIGS. 3, 4 and 5, after the sensing plates 42 are placed on the predetermined positions on the base 40, the PCB 50 is placed on the base 40 and the shaft tube 41 is inserted in the center hole 51. As the diameter of the center hole 51 of the PCB 50 is close to but not less than the outer diameter of the shaft tube, the sensing plates 42 can be covered and fixed to prevent the sensing plates 42 from dropping off on the one hand, and the correct placement position of the PCB 50 can be simply, promptly and conveniently positioned to prevent the occurrence of starting difficulty on the other hand, while the shaft tube 41 is inserted in the center hole 51 of the PCB 50.

Then, after the coil fixing pins 43 and the circuit board positioning pins 44 on the base 40 penetrate through the through holes 52 of the PCB 50 respectively, the coils 53 are inserted and fixed by the coil fixing pins 43.

The top ends of the circuit board positioning pins can be fixed with an adhesive or a soldering means, in which the soldering means employs a Teflon soldering iron to melt the top end of the circuit board positioning pin 44 to a bulge dot, thereby preventing the PCB 50 from being warped and making the PCB 50 and the base perfectly fit.

Figure 6:
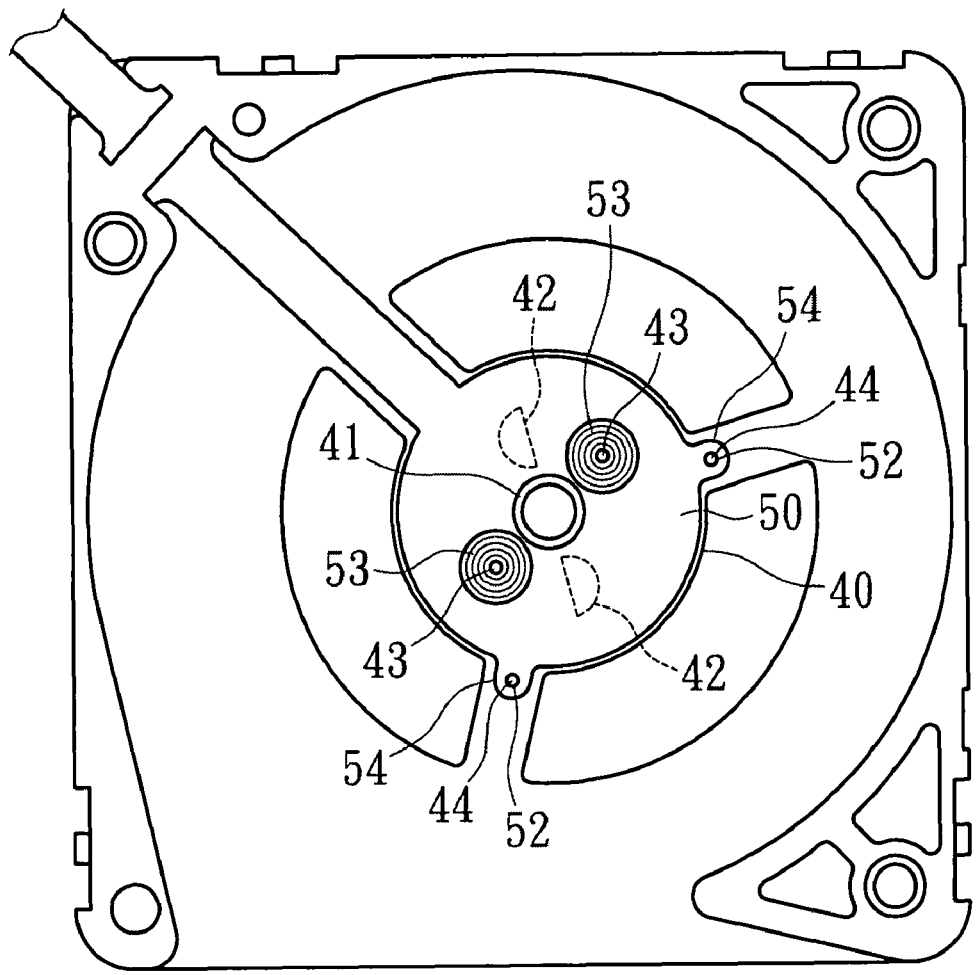
FIG. 6 is a plan view showing the second preferred embodiment of the present invention.

Moreover, as shown in FIG. 6, the through holes 52 on the PCB 50 of the present invention can be not only disposed on the unused place of the PCB but also disposed on a plurality of positioning protrusions 54 that are extended from the perimeter of the PCB 50. The design object that the PCB 50 and the base 40 are perfectly fit can be achieved by either way.

In contrast to the aforementioned conventional structure, the features of the present invention at least include:

a simple, fast and convenient positioning operation of PCB: As the diameter of the center hole of the PCB is close to but not less than the outer diameter of the shaft tube, when the shaft tube is inserted in the center hole of the PCB, the correct sensing position of the PCB can be simultaneously positioned. As such, the present invention can simply, promptly and conveniently position the correct placement position of the PCB to avoid the occurrence of starting difficulty and prevent the sensing plates from dropping off, so as to make the motor stably operate.

non-warped PCB: As at least one circuit board positioning pin is protruded beyond the base and corresponds to a respective through hole disposed on the PCB, the circuit board positioning pin can be fixed with an adhesive or a soldering means after penetrating through the through hole, such that the PCB and the base are perfectly fit to avoid warp or vibration thereof.

In sum, from the above-mentioned characteristics those features not only have a novelty among similar products and a progressiveness but also have an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A printed circuit board fixing structure of micro motor, comprising:

a base having a shaft tube disposed centrally therein and a bearing inserted in said shaft tube to support a spindle of a rotor to rotate therein, said rotor having a magnet; and a printed circuit board having a center hole for said shaft tube to be inserted in, wherein a diameter of said center hole is close to but not less than an outer diameter of said shaft tube, and a plurality of sensing plates are disposed underneath said printed circuit board and embedded in said base peripheral to said shaft tube, wherein said plurality of sensing plates are made of a magnetic material and arranged to attract said magnet, thereby stabilizing rotation of the rotor and preventing the spindle from coming off the shaft tube.

2. The printed circuit board fixing structure of claim 1, wherein at least one circuit board positioning pin protrudes beyond said base peripheral to said shaft tube, and each circuit board positioning pin corresponds to a through hole disposed on said printed circuit board.

3. The printed circuit board fixing structure of claim 1, wherein at least two coil fixing pins protrude beyond said base peripheral to said shaft tube, said coil fixing pins are so located that each radially-connected line thereof passes through a center of said shaft tube, and each said coil fixing pin corresponds to a through hole disposed on the printed circuit board for a coil to be inserted and fixed after passing through said through hole.

4. The printed circuit board fixing structure of claim 2, wherein a top end of each said circuit board fixing pin is fixed by one of an adhesive and a soldering means.

5. The printed circuit board fixing structure of claim 2, wherein a plurality of positioning protrusions are extended from a perimeter of said printed circuit board, and a through hole is disposed on each said positioning protrusion.

* * * * *